(12) United States Patent
Yamashita et al.

(10) Patent No.: US 9,793,844 B2
(45) Date of Patent: Oct. 17, 2017

(54) PERMANENT MAGNET MOTOR CONTROLLER

(71) Applicant: MITSUBISHI HEAVY INDUSTRIES, LTD., Tokyo (JP)

(72) Inventors: Yukio Yamashita, Tokyo (JP); Noriyuki Hayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 146 days.

(21) Appl. No.: 14/368,451

(22) PCT Filed: Oct. 10, 2012

(86) PCT No.: PCT/JP2012/076174
§ 371 (c)(1),
(2) Date: Jun. 24, 2014

(87) PCT Pub. No.: WO2013/099400
PCT Pub. Date: Jul. 4, 2013

(65) Prior Publication Data
US 2014/0375235 A1     Dec. 25, 2014

(30) Foreign Application Priority Data
Dec. 27, 2011 (JP) ................ 2011-286497

(51) Int. Cl.
*H02P 21/00* (2016.01)
*H02P 21/05* (2006.01)
(Continued)

(52) U.S. Cl.
CPC .......... *H02P 21/05* (2013.01); *H02P 21/0089* (2013.01); *H02P 21/22* (2016.02);
(Continued)

(58) Field of Classification Search
USPC ......... 318/400.02, 568.17, 646, 676, 400.34, 318/244, 42
See application file for complete search history.

(56) References Cited

U.S. PATENT DOCUMENTS 4,947,832 A * 8/1990 Blitzer ............... A61H 23/0254
5/109
5,880,549 A   3/1999 Chiba et al.
(Continued)

FOREIGN PATENT DOCUMENTS

EP     2019473 A1    1/2009
JP     04-236188 A * 8/1992
(Continued)

OTHER PUBLICATIONS

International Preliminary Report on Patentability (forms PCT/IB/338 and PCT/IB/373), dated Jul. 10, 2014, for International Application No. PCT/JP2012/076174.
(Continued)

*Primary Examiner* — Equardo Colon Santana
*Assistant Examiner* — Iftekhar Mustafa
(74) *Attorney, Agent, or Firm* — Birch, Stewart, Kolasch & Birch, LLP

(57) ABSTRACT

An object is to provide a permanent magnet motor controller capable of suppressing the rotary bending vibration that occurs in the permanent magnet motor effectively with simple configuration. A permanent magnet motor controller uses the dq coordinate conversion. A dq target current setting part adds the current component ($i^*_{da}$) that cancels the magnetic attractive force acting in the radial direction of the rotational shaft of the rotor of the permanent magnet motor to the d-axis target current value, whereby the eccentricity of the rotational shaft of the rotor is reduced.

8 Claims, 7 Drawing Sheets

13 VELOCITY AND POSITION SIGNAL PROCESSOR
14 dq TARGET CURRENT SETTING PART
15 THREE-PHASE AC/dq COORDINATE CONVERTING PART
16 d-AXIS TARGET VOLTAGE GENERATING PART
17 q-AXIS TARGET VOLTAGE GENERATING PART
18 dq/THREE-PHASE AC COORDINATE CONVERTING PART

(51) Int. Cl.
*H02P 27/08* (2006.01)
*H02P 21/22* (2016.01)
*H02P 29/032* (2016.01)

(52) U.S. Cl.
CPC .............. *H02P 21/50* (2016.02); *H02P 27/08* (2013.01); *H02P 29/032* (2016.02); *H02P 2207/05* (2013.01)

(56) References Cited

U.S. PATENT DOCUMENTS

2004/0245865 A1* 12/2004 Ries ....................... B63H 23/24
310/52
2011/0248656 A1* 10/2011 Yabuguchi .............. H02P 21/06
318/400.02

FOREIGN PATENT DOCUMENTS

| JP | 4-236188 A | 8/1992 |
| JP | 2006-7093 A | 1/2006 |
| JP | 2008-43175 A | 2/2008 |
| JP | 2013-135594 A | 7/2013 |
| WO | WO 96/35257 A1 | 11/1996 |
| WO | WO 2011/114912 A1 | 9/2011 |

OTHER PUBLICATIONS

Japanese Notice of Allowance, dated Oct. 24, 2014, for Japanese Application No. 2011-286497, along with an English translation.
Written Opinion of the International Searching Authority, and International Search Report, (forms PCT/ISA/237, PCT/ISA/210 and PCT/ISA/220), dated Nov. 20, 2012, for International Application No. PCT/JP2012/076174, along with an English translation of the Written Opinion.
Chiba et al., "Performance Characteristics and Parameter Identification for Inset Type Permanent Magnet Bearingless Motor Drive," Extended Summary for IEEE-PES Meeting at Denver, Panel Session on High Speed Drive, Jun. 6, 2004, pp. 1-4, XP010756964.
Extended European Search Report for European Application No. 12861516.8, dated May 11, 2016.
Nguyen et al., "Improvement of Sensorless Speed Control for Nonsalient Type Axial Gap Self-Bearing Motor Using Sliding Mode Observer.," IEEE International Conference, Mar. 14, 2010, pp. 373-378, XP031681155.

* cited by examiner

13 VELOCITY AND POSITION SIGNAL PROCESSOR
14 dq TARGET CURRENT SETTING PART
15 THREE-PHASE AC/dq COORDINATE CONVERTING PART
16 d-AXIS TARGET VOLTAGE GENERATING PART
17 q-AXIS TARGET VOLTAGE GENERATING PART
18 dq/THREE-PHASE AC COORDINATE CONVERTING PART

13 VELOCITY AND POSITION SIGNAL PROCESSOR 14 dq TARGET CURRENT SETTING PART

15 THREE-PHASE AC/dq COORDINATE CONVERTING PART 16 d-AXIS TARGET VOLTAGE GENERATING PART 17 q-AXIS TARGET VOLTAGE GENERATING PART 18 dq/THREE-PHASE AC COORDINATE CONVERTING PART

Related Art

0°

30°

60°

90°

120°

150°

Related Art

PERMANENT MAGNET MOTOR CONTROLLER

TECHNICAL FIELD

This invention relates to a controller for a permanent magnet motor. Especially, this invention relates to the technical field of a permanent magnet motor controller using the dq coordinate conversion, which is generally used for a permanent magnet motor controller.

BACKGROUND

A permanent magnet motor (permanent magnet synchronous motor) is easy to perform maintenance on because it does not have a mechanical rectifying mechanism, and also has high efficiency because it utilizes a permanent magnet. Therefore, a permanent magnet motor is widely used as a motor for an electric automobile, an industrial machine, a compressor of an air conditioner and the like.

FIG. 8 is a cross-sectional view of an internal configuration of a typical permanent magnet motor. The motor M10 shown in FIG. 8 is a permanent magnet synchronous motor having a two-pole and three-slot structure including a rotor 1 (which may be of either the internally embedded magnet type or the surface magnet type) and a stator 2 of the concentrated winding structure. The rotor M10 is configured to be driven by phase alternate current applied to each stator winding 4 wound around the stator iron core 3.

The controller for a permanent magnet motor using the dq coordinate conversion performs control as follows. First, the phase current flowing through the stator winding 4 of the motor M10 is detected, and then the phase current of the rest frame coordinate system is converted into a d-axis current value and a q-axis current value of the rotating frame coordinate system. Then, the proportional-integral control is performed so that the d-axis current value becomes a d-axis current command value, thereby generating a d-axis voltage value. Also, the proportional-integral control is performed so that the q-axis current value becomes a q-axis current command value, thereby generating a q-axis voltage value. Then, these d-axis and q-axis voltage command values are converted into phase voltage command values of the rest frame. The voltage indicated by the phase voltage command values is applied to the stator winding 4. Then, the phase current of sinusoidal shape indicated by the d-axis and q-axis current command values is applied to the stator winding 4, thereby causing the predetermined output torque to occur.

In the permanent magnet motor of this kind, eccentricity is caused in a rotating rotor by the magnetic attractive force acting on the rotor. FIGS. 9A to 9F are schematic diagrams of eccentricity of the rotor 1 according to the typical permanent magnet motor M10. In this example, the rotor 1 rotates 180 degrees in the counterclockwise direction as shown in FIG. 9A through FIG. 9F (see the bold line marked on a part of the surface of the rotor 1 in the drawings). At the same time, the center of the rotor 1 is rotated 360 degrees in the clockwise direction by the magnetic attractive force (see the arrow in the radial direction in the drawings). Accordingly, in a permanent magnet motor having the two-pole and three-slot structure, eccentricity occurs with frequency of twice the mechanical rotation frequency of the rotor 1, causing the rotary bending vibration.

As a usage of a permanent magnet motor, an electric supercharger or a generator can be considered for instance. However, such usages may cause the rotation frequency of the rotor 1 to reach more than tens of thousands rotations inclusive, increasing the frequency of rotary bending vibration as well. This may lead to the fatigue fracture of the rotor 1. Especially, since the rotor in these usages is rotatably supported by a sliding bearing, which has a large backlash compared to the roller bearing, eccentricity is likely to occur in the rotor 1 as well as the fatigue fracture due to the rotary bending vibration.

As described above, it is a major problem for the permanent magnet motor to take a countermeasure for the rotary bending vibration of the rotor. Patent Document 1 is an example of the countermeasure technology of this kind. In Patent Document 1, the motor is stopped when rotary bending vibration is detected in the rotor so as to prevent the rotor from being fractured by the rotary bending vibration.

CITATION LIST

Patent Literature

Patent Document 1: JP2006-007093A

SUMMARY

Technical Problem

However, in Patent Document 1, the motor is stopped upon the rotary bending vibration having occurred and thus the problem of the rotary bending vibration of the rotor itself is not fundamentally solved. Especially in Patent Document 1, it is inevitable to stop the motor when the rotary bending vibration occurs, which results in significant restriction on the operation.

Various techniques can be considered as a measure for restraining the rotary bending vibration of the rotor. For instance, physical durability may be increased with large rotor diameter to prevent fracture. However, larger rotor diameter increases inertia and thereby causes deterioration of the responsiveness, which is a merit of the electric supercharger. Also, while one may consider modifying the form of the rotor to increase the durability against the rotary bending vibration, it is disadvantageous in view of the cost because additional step of processing is required. Further, one may consider reducing eccentricity of the rotor by decreasing the backlash of the hearing that rotatably supports the rotor to suppress the rotary bending vibration. However, decreased backlash may lead to deterioration of the damping property of the bearing, which may increase the rotor vibration or shorten the lifetime of the motor.

The present invention has been made in view of the above problems and is to provide a permanent magnet motor controller capable of suppressing the rotary bending vibration that occurs in the permanent magnet motor effectively with simple configuration.

Solution to Problem

In order to solve the above problem, the first permanent magnet motor controller according to the present invention comprises: a current detecting part configured to detect a phase current flowing through a permanent magnet motor; a three-phase/dq coordinate converting part configured to convert the phase current detected by the current detecting part into a current value of an orthogonal coordinate system (hereinafter, referred to as "dq coordinate system") that rotates in synchronization with a rotation of a motor; a dq target current setting part configured to set a target current value of the dq coordinate system based on a rotation speed of the motor; a dq target voltage generating part configured to generate the target voltage value of the dq coordinate system based on the current value of the dq coordinate system converted by the three-phase dq coordinate converting part and the target current value of the dq coordinate system set by the dq target current setting part; a dq/three-phase coordinate converting part configured to convert the target voltage value of the dq coordinate system generated by the dq target voltage generating part into a three-phase target voltage value; and a power converting part configured to convert the three-phase target voltage value generated by the dq/three-phase converting part into a three-phase motor driving current, wherein the dq target current setting part is configured to add a current component which cancels a magnetic attractive force to a d-axis target current value, the magnetic attractive force acting in a radial direction of a rotor rotational shaft of the permanent magnet motor, thereby reducing an eccentricity of the rotor rotational shaft.

According to the first permanent magnet motor controller, it is possible to effectively suppress the rotary bending vibration that occurs in the permanent magnet motor by setting a target value of the d-axis current value so that it cancels the eccentricity caused in the radial direction due to the magnetic attractive force acting on the rotor inside the motor. In the dq target current setting part, the component for cancelling the magnetic attractive force is added to the target value of the d-axis current value by calculating in advance the magnetic attractive force that acts on the rotor by magnetic field analysis and the like. As a result, the first permanent magnet motor controller is capable of suppressing the rotary bending vibration by controlling current and voltage without changing the physical configuration of the motor. Thus, it is possible to provide a permanent magnet motor controller that has a simple motor configuration and is low cost.

In one embodiment of the first permanent magnet motor controller, the permanent magnet motor controller further comprises a displacement sensor configured to detect a displacement in the radial direction of the rotor rotational shaft of the permanent magnet motor, wherein the dq target current setting part is configured to calculate the magnetic attractive force acting in the radial direction of the rotor rotational shaft based on a detected value of the displacement sensor, thereby determining the current component to be added to the target value of the d-axis current value. According to this embodiment, it is possible to obtain the eccentricity of the rotor rotational shaft as an actual measured value, and thus to calculate the current component with high accuracy and to prevent the rotary bending vibration.

Also, in another embodiment of the first permanent magnet motor controller, a table is prepared which in advance defines a current component to be added to the d-axis current target value based on a rotation angle of the rotor rotational shaft, and wherein the dq target current setting part is configured to add the current component retrieved from the table to the d-axis current target value based on the rotation angle of the rotor rotational shaft. According to this embodiment, by storing the current component to be added in the table in advance, it is possible to cope with the case in which it is difficult to obtain the appropriate d-axis current by mathematical calculation.

In order to solve the above problems, the second permanent magnet motor controller according to the present invention comprises: a current detecting part configured to detect a phase current flowing through a first stator winding wound around a stator iron core of a permanent magnet motor; a three-phase/dq coordinate converting part configured to convert the phase current detected by the current detecting part into a current value of an orthogonal coordinate system (hereinafter, referred to as "dq coordinate system") that rotates in synchronization with a rotation of a motor; a dq target current setting part configured to set a target current value of the dq coordinate system based on a rotation speed of the motor; a dq target voltage generating part configured to generate a target voltage value of the dq coordinate system based on the current value of the dq coordinate system converted by the three-phase/dq coordinate converting part and the target current value of the dq coordinate system set by the dq target current setting part; a dq/three-phase coordinate converting part configured to convert the target voltage value of the dq coordinate system generated by the dq target voltage generating part into a three-phase target voltage value; a power converting part configured to convert the three-phase target voltage value generated by the dq/three-phase coordinate converting part into a three-phase motor driving current; and a second stator winding wound around the stator iron core of the permanent magnet motor independently of the first stator winding, wherein a current which cancels a magnetic attractive force is applied to the second stator winding, the magnetic attractive force acting in a radial direction of the rotor rotational shaft of the permanent magnet motor, thereby reducing an eccentricity caused on the rotor rotational shaft.

In the above first permanent magnet motor controller, the d-axis current value of the phase current for driving the motor is varied, raising the possibility that the phase current, which is vector sum of the d-axis current value and the q-axis current component that contributes to the output torque, increases and the voltage to be applied to the converter falls short. On the other hand, in the second permanent magnet motor controller, the second stator winding is wound around independently of the first stator winding through which the phase current for driving the motor flows and the current value of the second stator winding is adjusted. In this manner, it is possible to reduce the magnetic attractive force applied in the radial direction of the rotor. As a result, it is possible to suppress the rotary bending vibration without causing shortage of the inverter voltage.

In the second permanent magnet motor controller, the permanent magnet motor controller may further comprise a displacement sensor configured to detect a displacement in the radial direction of the rotor rotational shaft of the permanent magnet motor, wherein the magnetic attractive force acting in the radial direction of the rotor rotational shaft is calculated based on a detected value of the displacement sensor, thereby determining the current to be applied to the second stator winding. According to this embodiment, it is possible to obtain the eccentricity of the rotor rotational shaft as an actual measured value as described above. As a result, it is possible to accurately calculate the current component, and thus to prevent the rotary bending vibration.

Also, the permanent magnet motor controller may further comprise a rotation angle detecting part configured to detect a rotation angle of the permanent magnet motor; and a table which in advance defines a current to be applied to the second stator winding based on the rotation angle of the permanent magnet motor, wherein a current value retrieved from the table is applied to the second stator winding based on the rotation angle detected by the rotation angle detecting part. According to this embodiment, by storing the electric current to be applied to the second stator winding in the table in advance, it is possible to cope with the case in which it is difficult to obtain the appropriate d-axis current by mathematical calculation.

In order to solve the above problems, the third permanent magnet motor controller according to the present invention comprises a current detecting part configured to detect a current which flows through a magnet bearing rotatably supporting a rotor rotational shaft of a permanent magnet motor; a displacement sensor configured to detect a displacement amount in a radial direction of the rotor rotational shaft; a target current value setting part configured to set a target current value flowing through the magnet bearing based on a detected value of the displacement sensor; and a current control part configure to control the current flowing through the magnet bearing so that the current becomes the target current value, wherein the target current setting part is configured to add a current component which cancels a magnet attractive force to the target current value, the magnet attractive force acting in a radial direction of the rotor rotational shaft of the permanent magnet motor, thereby reducing an eccentricity of the rotor rotational shaft.

According to the third permanent magnet motor controller, it is possible to reduce the eccentricity of the rotor rotational shaft by adding the current component to the current value that flows through the magnet bearing. The current value is configured to cancel the magnetic attractive force acting in the radial direction of the rotor rotational shaft of the permanent magnet motor controller.

Also, in the third permanent magnet motor controller, a table is prepared which in advance defines a current component to be added so as to cancel a magnetic attractive force in a radial direction of the rotor rotational shaft based on the displacement amount in the radial direction of the rotor rotational shaft, and wherein the target current setting part is configured to add the current component retrieved from the table to the target current value based on the displacement amount detected by the displacement sensor. According to the present invention, by storing the current component to be added to cancel the magnetic attractive force in the table in advance, it is possible to cope with the case in which it is difficult to obtain the appropriate d-axis current by mathematical calculation.

Advantageous Effects

According to the first permanent magnet motor controller, it is possible to effectively suppress the rotary bending vibration that occurs in the permanent magnet motor controller by setting the target value of the d-axis current value so that it cancels the eccentricity caused in the radial direction due to the magnetic attractive force acting on the rotor inside the motor. In the dq target current setting part, the component for cancelling the magnetic attractive force is added to the target value of the d-axis current value by calculating in advance the magnetic attractive force that acts on the rotor by magnetic field analysis and the like. As a result, the first permanent magnet motor controller is capable of suppressing the rotary bending vibration by controlling current and voltage without changing the physical configuration of the motor. Thus, it is possible to provide a permanent magnet motor controller that has a simple configuration and is low cost.

In the second permanent magnet motor controller, the second stator winding is wound around independently of the first stator winding through which the phase current for driving the motor flows and the current value of the second stator winding is adjusted to reduce the magnetic attractive force applied in the radial direction of the rotor. As a result, it is possible to suppress the rotary bending vibration without causing shortage of the voltage of the inverter.

According to the third permanent magnet motor controller, it is possible to reduce the eccentricity of the rotor rotational shaft by adding the current component to the current value that flows through the magnet bearing, the current value being configured to cancel the magnetic attractive force acting in the radial direction of the rotor rotational shaft of the permanent magnet motor controller.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)

Figure 1:
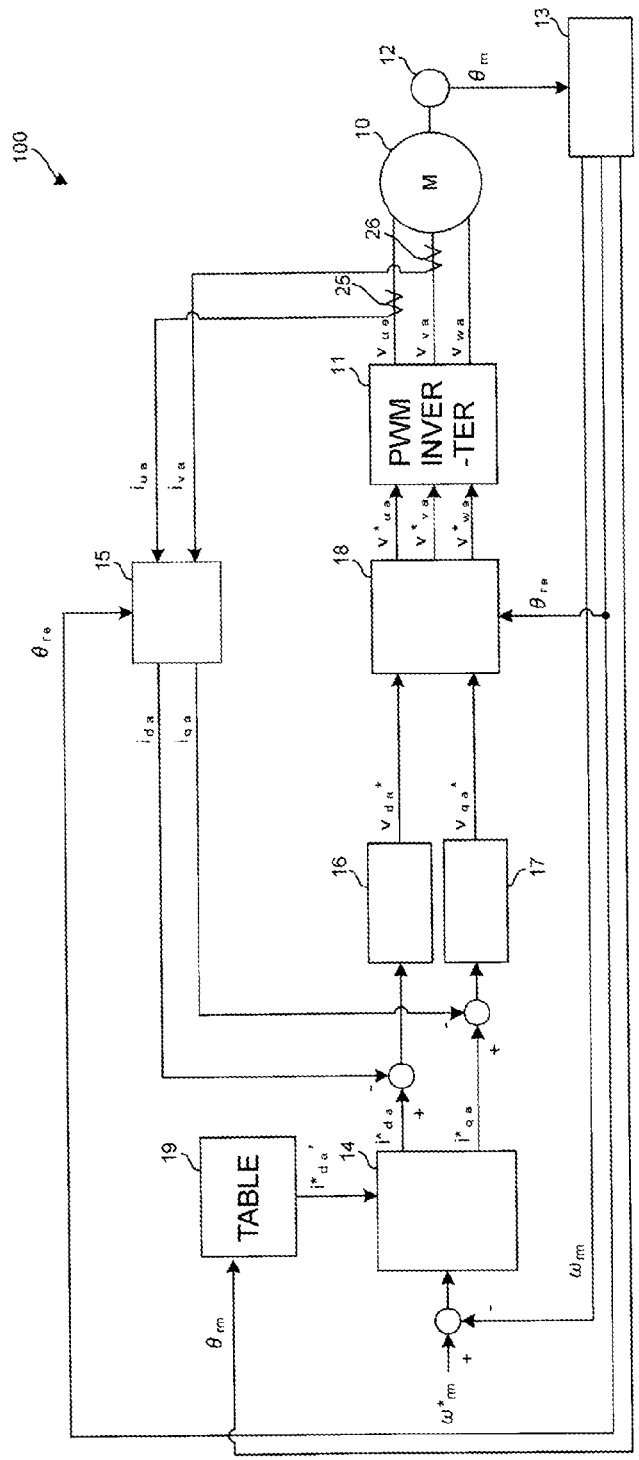
FIG. 1 is a block diagram of the overall configuration of the permanent magnet motor controller according to the first embodiment.
Figure 8:
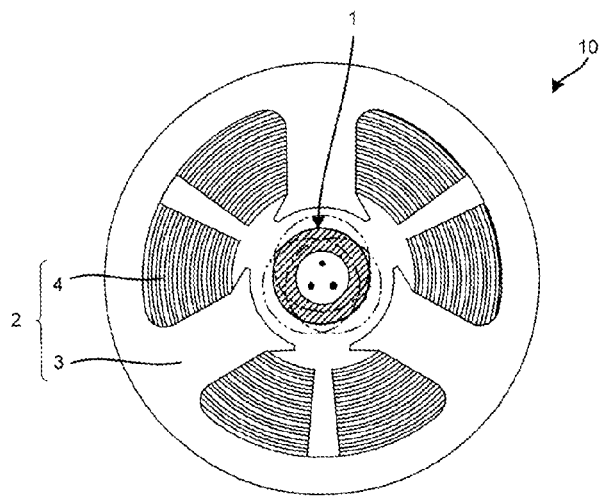
FIG. 8 is a cross-sectional view of the internal configuration of the typical permanent magnet motor controller.
Figure 9A:
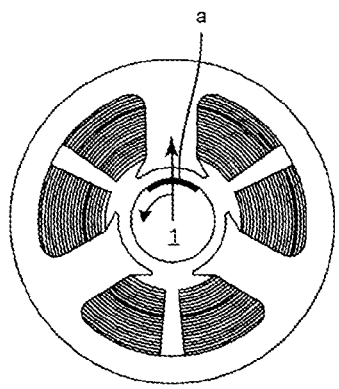
FIGS. 9A to 9F are schematic diagrams of eccentricity of the rotor according to the typical permanent magnet motor.
Figure 9B:
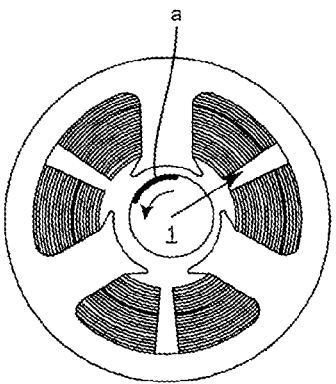
Figure 9C:
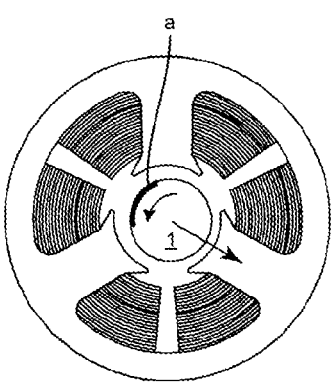
Figure 9D:
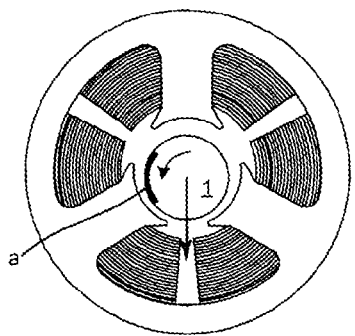
Figure 9E:
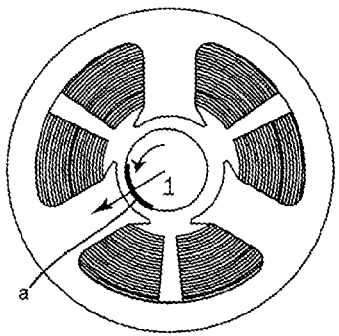
Figure 9F:
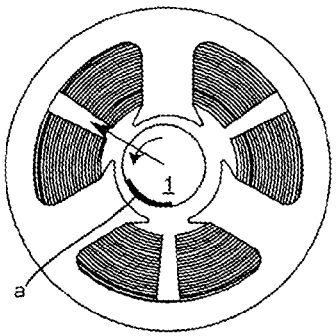

FIG. 1 is a block diagram of the overall configuration of the permanent magnet motor controller 100 according to the first embodiment. The motor M10 is a control target of the permanent magnet motor controller 100 shown in FIG. 1. The motor M10 basically has the configuration described in reference to FIG. 8 unless otherwise described below, and thus overlapping description will be omitted for convenience. Herein, the motor M10 is a permanent magnet synchronous motor driven by three-phase alternate current and including a stator of the concentrated winding structure and a rotor of the internally embedded magnet type or the surface magnet type, such as the IPM motor and the SPM motor.

The basic part of the permanent magnet motor controller 100 according to the present invention, which is configured to drive the motor M10, includes: a PWM inverter 11 being a power control converting part configured to apply the three-phase alternate current voltage $v_{ua}$, $v_{va}$, $v_{wa}$ that drive the motor M10 to the motor M10; an encoder 12 (or a resolver) connected to the motor M10 and configured to detect the rotational position Θm of the motor M10; a velocity and position signal processor 13 configured to calculate mechanical angle $\theta_{rm}$ and electric angle $\theta_{re}$, as well as the corresponding angular velocity $\omega_{rm}$, $\omega_{re}$ of the mechanical angle $\theta_{rm}$ and the electric angle $\theta_{re}$ based on the rotational position signal θm from the encoder 12; a dq target current setting part 14 configured to set dq target current value $i^*_{da}$, $i^*_{qa}$ by performing proportional-integral control so that the mechanical angular velocity $\omega_{rm}$ becomes the target mechanical angular velocity $\omega^*_{rm}$; a three-phase/dq coordinate converting part 15 configured to convert the actual current $i_{ua}$, $i_{va}$ of three-phase alternate current of the motor M10 detected by the current detection sensor 25, 26 to the actual current $i_{da}$, $i_{qa}$ of the dq axis coordinate system; and a d-axis target voltage generating part 16 and a q-axis target voltage generating part 17 configured to generate the target voltage value $v_{da}^*$, $v_{qa}^*$ of the dq coordinate system based on the dq axis current value $i_{da}$, $i_{qa}$ converted in the three-phase/dq coordinate converting part 15 and the target current value $i^*_{da}$, $i^*_{qa}$ set in the dq target current setting part 14.

The above permanent magnet motor controller 100 first detects the phase current flowing through the stator winding 4 of the motor M10 by the current detection sensor 25, 26, and then converts the actual current $i_{ua}$, $i_{va}$ of three-phase alternate current of the rest frame coordinate system to the d-axis current value $i_{da}$, and the q-axis current value $i_{qa}$ of the rotational frame coordinate system in the three-phase/dq coordinate converting part 15. Then, in the d-axis target voltage generating part 16, proportional-integral control is performed to generate the d-axis target voltage value $v^*_{da}$ such that the d-axis current value $i_{da}$ becomes the d-axis target current value $i^*_{da}$ set in the dq target current setting part 14. In the q-axis target voltage generating part 17, proportional-integral control is performed to generate the q-axis target voltage value $v^*_{qa}$ such that the q-axis current value $i_{qa}$ becomes the q-axis target current value $i^*_{qa}$ set in the dq target current setting part 14.

These d-axis target voltage value $v_{da}^*$ and the q-axis target voltage value $v_{qa}^*$ are converted into the target voltage value $v^*_{ua}$, $v^*_{va}$, $v^*_{wa}$ of the rest frame in the dq/three-phase alternate current coordinate converting part 18, and then converted into the voltage $v_{ua}$, $v_{va}$, $v_{wa}$ in the PWM inverter 11 to be applied to the stator winding 4 of the motor M10. As a result, such control is performed that the three-phase alternate current of sinusoidal shape indicated by the d-axis current target value $i^*_{da}$ and the q-axis target value $i^*_{qa}$ flows through the stator winding 4, thereby causing the predetermined output.

Herein, conventionally in the dq target current setting part 14, the q-axis target current value $i^*_{qa}$ as large as possible is secured by setting the d-axis target current value $i^*_{da}$ as small as possible (typically, to zero) from the perspective of output efficiency of the motor torque. On the other hand, in the permanent magnet motor controller 100 according to the present embodiment, the dq target current setting part 14 is configured to add the current component $i^*_{da}{'}$ to the d-axis target current value. The current component $i^*_{da}{'}$ is configured to cancel the magnetic attractive force acting in the radial direction of the rotor 1 of the motor M10.

Figure 2:
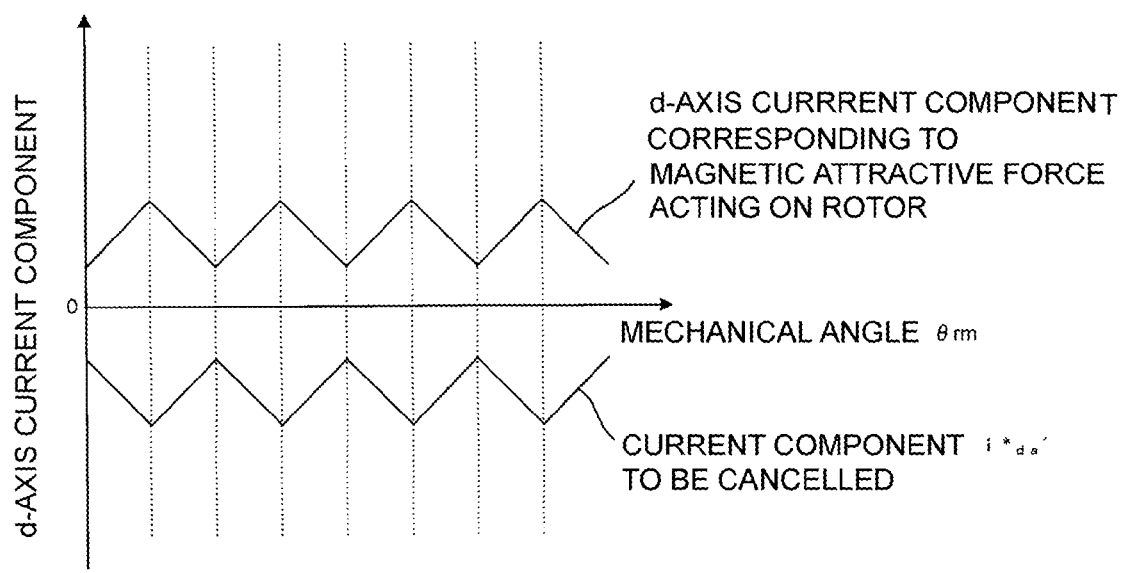
FIG. 2 is an exemplary graph of the d-axis current component corresponding to the magnetic attractive force acting in the radial direction of the rotor and a current component $i^*_{da}{}'$ to be added to the d-axis target current value in the dq target current setting part.

FIG. 2 is an exemplary graph of the d-axis current component corresponding to the magnetic attractive force acting in the radial direction of the rotor 1 and of a current component $i^*_{da}{'}$ to be added to the d-axis target current value in the dq target current setting part. The motor M10 is a permanent magnet motor controller having the two-pole three-slot structure (see FIG. 8). The magnetic attractive force acting in the radial direction of the rotor 1 shows cyclic behavior every electric angle of 60 degrees (see FIG. 9). The current component $i^*_{da}{'}$ is calculated by reversing the sign of the d-axis current component corresponding to the magnetic attractive force so as to cancel the magnetic attractive force acting in the radial direction of the rotor 1.

Especially in the present embodiment, the displacement of the rotor 1 in the radial direction is defined in advance in the table 19 in accordance with the rotational angle of the rotor 1. The dq target current setting part 14 estimates the displacement in the radial direction of the rotor 1 based on the rotational angle obtained from the velocity and position signal processor 13. Then, the magnetic attractive force acting in the radial direction of the rotor 1 is calculated from the estimated displacement to derive the d-axis current component corresponding thereto. Further, as shown in FIG. 2, the current component $i^*_{da}{'}$ to be added to the d-axis target current value is acquired by reversing the sign of the calculated d-axis current component.

As described above, in the present embodiment, the d-axis target current value $i^*_{da}$ is calculated in the dq target current setting part 14 from the following equation:

$$i^*_{da} = \text{conventional d-axis target current value (typically, zero)} + i^*_{da}{'} \quad (1)$$

As a result, it is possible to effectively suppress the rotary bending vibration that occurs in the motor M10 by setting a target value of the d-axis current value so that it cancels the eccentricity caused in the radial direction due to the magnetic attractive force acting on the rotor inside the motor M10.

Especially, as shown in FIG. 1, by defining in advance the displacement in the radial direction of the rotor 1 in accordance with the rotational angle of the rotor 1 in the table 19, it is possible to cope with the case in which it is difficult to obtain the appropriate d-axis current by mathematical calculation.

Figure 3:
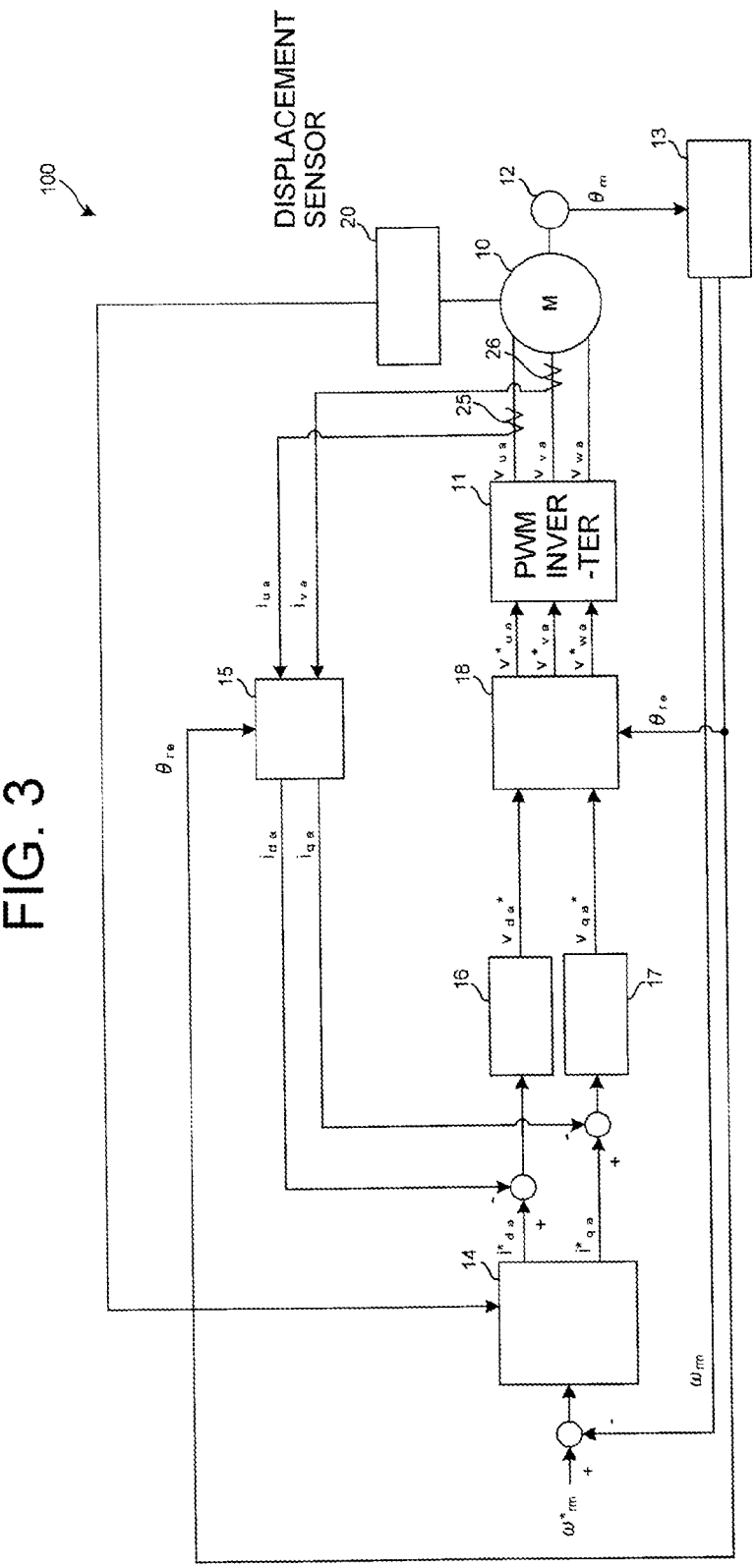
FIG. 3 is a block diagram of a modification of the permanent magnet motor controller according to the first embodiment.

FIG. 3 is a block diagram of a modification of the permanent magnet motor controller 100 according to the first embodiment. In this modified embodiment, a displacement sensor 20 is provided for detecting the displacement (that is, the amount of eccentricity) of the rotor 1 of the motor M10. As a result, the amount of eccentricity of the rotor 1 is directly detected, and the magnetic attractive force acting in the radial direction of the rotor 1 is calculated based on the amount of eccentricity detected in the target current setting part 14. Then, $i^*_{da}{'}$ is calculated so that it cancels the calculated magnetic attractive force (see FIG. 2), and then the d-axis target current value $i^*_d$ is set based on the above equation (1).

In the present modified embodiment, even though the load for the calculation increases in the target current setting part 14, it is possible to obtain the eccentricity of the rotor 1 as an actual measured value. As a result, it is possible to calculate the current component $i^*_{da}{'}$ for cancelling the magnetic attractive force with higher accuracy and thus to prevent the rotary bending vibration more effectively.

As described above, according to the permanent magnet motor controller 100 of the first embodiment, it is possible to effectively suppress the rotary bending vibration caused in the motor M10 by setting a target value of the d-axis current value so that it cancels the eccentricity caused in the radial direction due to the magnetic attractive force acting on the rotor 1 inside the motor M10. In this manner, it is possible to suppress the rotary bending vibration by controlling the electric current and voltage without changing the physical configuration of the motor. Thus, it is possible to provide a permanent magnet motor controller that has a simple configuration and is low cost.

(Second Embodiment)

Figure 4:
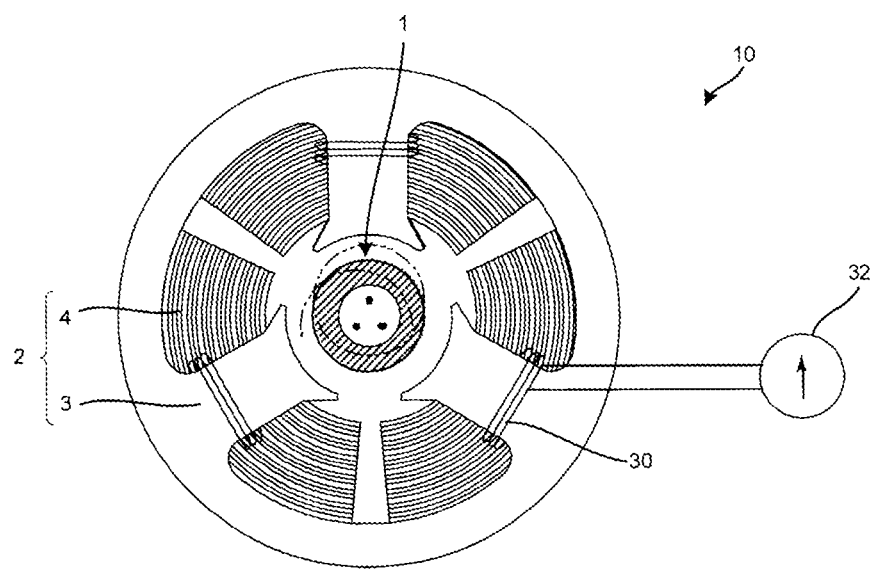
FIG. 4 is a cross-sectional view of the internal configuration of the permanent magnet motor controller according to the second embodiment.

FIG. 4 is a cross-sectional view of the internal configuration of the permanent magnet motor according to the second embodiment. In FIG. 4, a feature similar to that of the first embodiment is associated with the same reference sign to omit overlapping description for convenience. In the second embodiment, the stator winding 30 is further provided in addition to the stator winding 4 similar to that of the first embodiment. That is, the stator winding 4 is an example of the "first stator winding" of the present invention, and the stator winding 30 is an example of the "second stator winding" of the present invention. Also, a current source 32 is connected to the stator winding 30 so that alternate current can be applied independently of the stator winding 4.

In the first embodiment described above, the d-axis current value applied to the stator winding 4 is varied. Thus, loss occurs in the q-axis current component that contributes to the output torque. That is, given that the voltage of the inverter is constant in the first embodiment, the q-axis current component decreases in term of vector in accordance with the amount of the current component $i^*_{da}{'}$ applied to the d-axis current value, thereby also reducing the torque.

On the other hand, in the second embodiment, it is possible to reduce the magnetic attractive force applied in the radial direction or the rotor 1 by providing the stator winding 30 wound independently of the stator winding 4 through which the phase current for driving the motor flows to adjust the current value of the stator winding 30 in the current source 32. That is, in the dq target current setting part 14, the d-axis target current value $i^*_{da}$ is set as small as possible (typically, to zero) and the q-axis target current value $i^*_{qa}$ as large as possible is secured from the perspective of output efficiency of the motor torque similarly to the conventional case, so as to apply phase current to the stator winding 4 to drive the motor. On the other hand, the d-axis current component $i^*_{da}{'}$ set by the above equation (1) is applied to the stator winding 30 from the current source 32. As a result, it is possible to cancel the magnetic attractive force acting in the radial direction of the rotor 1 without changing the current value at the stator winding 4.

As described above, according to the second embodiment, it is possible to effectively suppress the rotary bending vibration without reducing the driving efficiency of the motor M10.

(Third Embodiment)

Figure 5:
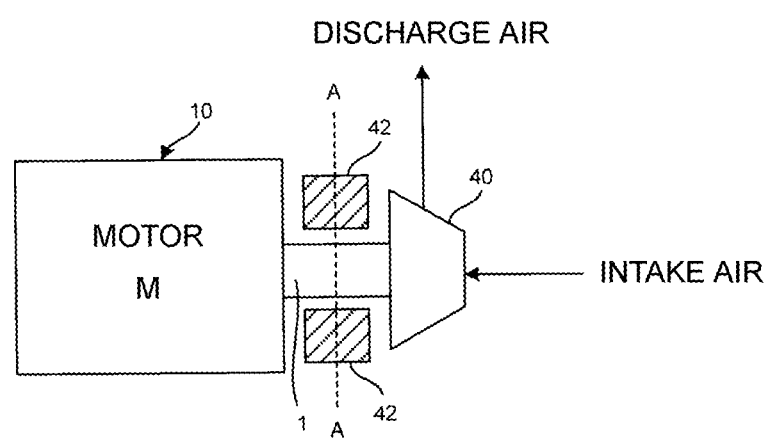
FIG. 5 is a schematic diagram of the permanent magnet motor controller according to the third embodiment and the surrounding structure.
Figure 6:
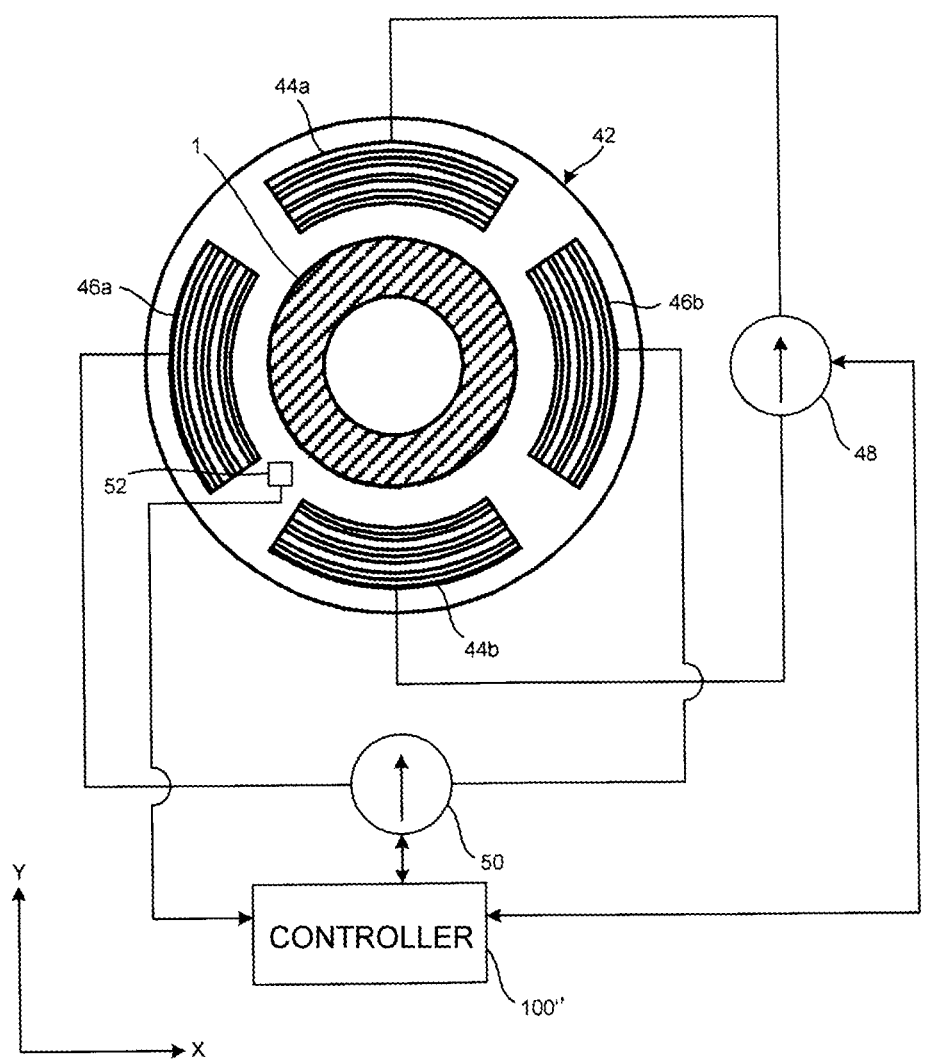
FIG. 6 is a cross-sectional view taken along the line A-A of FIG. 5 along with the electric current source of the magnet bearing.

Subsequently, referring to FIGS. 5 to 7, the permanent magnet motor controller according to the third embodiment will be described. FIG. 5 is a schematic diagram of the permanent magnet motor and its surrounding structure according to the third embodiment. FIG. 6 is a cross-sectional view taken along the line A-A of FIG. 5 along with the electric current source of the magnet bearing. In FIG. 5, illustrated is the case in which the motor M10 is used as the power source for the electric supercharger. A compressor 40 as a load is connected to the end of the rotor 1. The compressor 40 is configured to supercharge the intake air as discharge air. The rotor 1 is rotatably supported by the magnet bearing 42.

As shown in FIG. 6, the magnet bearing 42 includes a pair of electric magnets 44a, 44b arranged one above the other, and another pair of electric magnets 46a, 46b arranged right and left. The electric magnets 44a, 44b are arranged along the Y-axis direction facing each other across the rotor 1, and apply magnetic attractive force on the rotor 1 by controlling the current source 48 to control the position in the Y-axis direction. The electric magnets 46a, 46b are arranged along the X-axis direction facing each other across the rotor 1, and apply magnetic attractive force on the rotor 1 by controlling the current source 50 to control the position in the X-axis direction.

Also, a displacement sensor 52 is disposed in the vicinity of the rotor 1 for detecting the displacement from the central axis of the rotor 1 along each of the X-axis and the Y-axis. The detected value of the displacement sensor 52 is inputted into the controller 100", and thereby the output current value of the power source 48, 50 is controlled based on the processed result thereof.

Although a magnet bearing having a pair of electric magnets along each of X-axis and Y-axis is described as an example in the present embodiment to simplify the description, the present invention can be obviously applied for the case where more electric magnets are provided along the circumference of the rotor 1.

Figure 7:
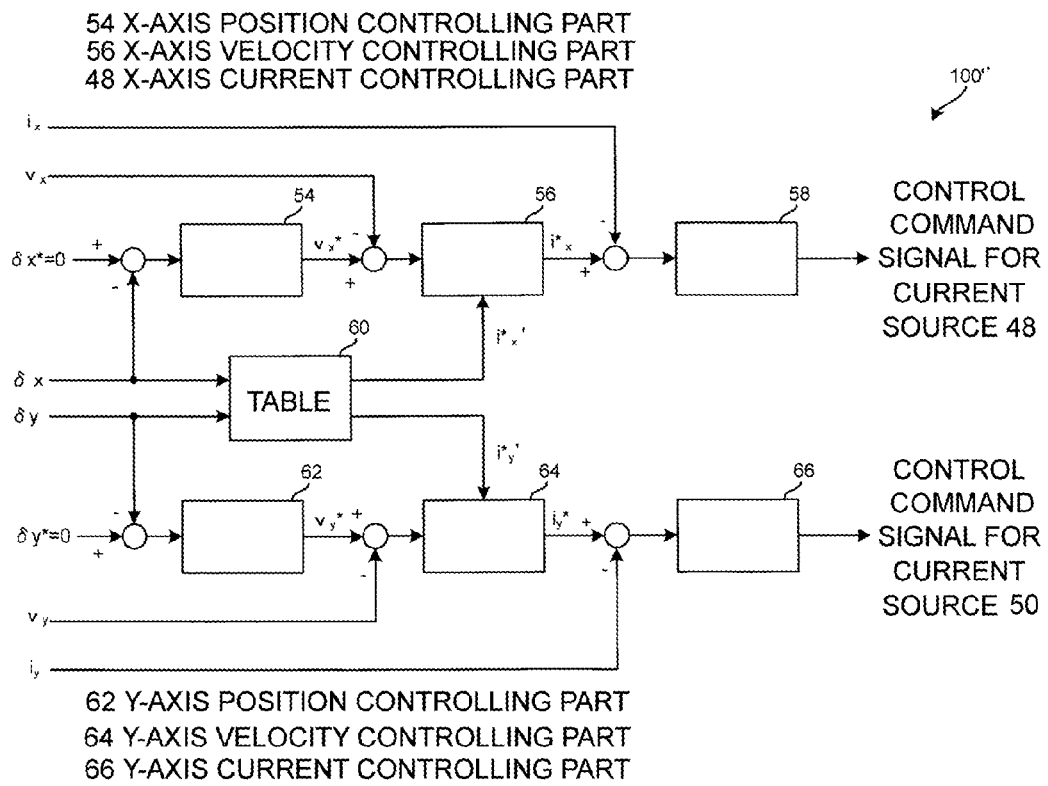
FIG. 7 is a block diagram of the internal configuration of the permanent magnet motor controller according to the third embodiment.

FIG. 7 is a block diagram of the internal configuration of the permanent magnet motor controller 100" according to the third embodiment.

First, the position control of the rotor 1 in the X-axis direction by the permanent magnet motor controller 100" will be described. The displacement amount $\delta_x$, the velocity $v_x$ being the derivative value of the displacement amount $\delta_x$ in the X-axis direction, and the actual current value $i_x$ of the current source 48 are inputted into the permanent magnet motor controller 100", as the detected values of the displacement sensor 52. In the magnet bearing 42, the target displacement amount $\delta_x^*$ is set to zero in order to keep the rotor 1 on the central axis. The X-axis position controlling part 54 calculates the target velocity $v_x^*$ based on the deviation between the target displacement amount $\delta_x^*$ and the displacement amount $\delta_x$ being the detected value of the displacement sensor 52. Then, the X-axis velocity controlling part 56 calculates the target current value $i_x^*$ based on the deviation between the target velocity $v_x^*$ and the velocity $v_x$ obtained by differentiating the detected value of the displacement sensor 52. The X-axis current controlling part 58 generates a control command signal for the current source 48 based on the deviation between the target current value $i_x^*$ obtained as described above and the actual current value $i_x$ in the current source 48.

Herein, in the X-axis velocity controlling part 56, the current component $i^*_x{'}$ that cancels the magnetic attractive force acting in the radial direction of the rotor 1 is added to calculate the target current value $i^*_x$. The current component $i^*_x{'}$ that cancels the magnetic attractive force acting in the radial direction of the rotor 1 is defined in the table 60 in advance to correspond to the displacement amount $\delta_x$. The permanent magnet motor controller 100" calculates the current component $i^*_x{'}$ to be added based on the displacement $\delta_x$ obtained from the displacement sensor. In this manner, in the present embodiment, the target current value $i^*_x$ is obtained in the X-axis velocity controlling part from the following equation (2):

$$i^*_x = \text{conventional X-axis target current value} + i^*_x{'} \quad (2)$$

As a result, it is possible to effectively suppress the rotary bending vibration that occurs in the motor M10 by setting a target value of the X-axis current value so that it cancels the eccentricity caused in the radial direction due to the magnetic attractive force acting on the rotor inside the motor M10.

The control of the position of the rotor 1 in the Y-axis direction is performed by the permanent magnet motor controller 100" similarly to the above described control of the position in the X-axis direction. The following description is simplified to omit the overlapping details. In the magnet bearing 42, the target displacement amount $\delta_y{}^*$ is set to zero in order to keep the rotor 1 on the central axis. The Y-axis position controlling part 62 calculates the target velocity $v_y{}^*$ based on the deviation between the target displacement amount $\delta_y{}^*$ and the displacement amount $\delta_y$ being the detected value of the displacement sensor 52. The Y-axis velocity controlling part 64 calculates the target current value $i_y{}^*$ based on deviation between the target velocity $v_y{}^*$ and the velocity $v_y$ obtained by differentiating the detected value of the displacement sensor 52. Then, the Y-axis current controlling part 64 generates a control command signal for the current source 50 based on the deviation between the target current value $i_y{}^*$ and the actual current value i in the current source 50.

Herein, the Y-axis velocity controlling part 64 calculates the target current value $i_y{}^*$ by adding the current component $i_y{}^{*\prime}$ that cancels the magnetic attractive force acting in the radial direction of the rotor 1. This current component $i_y{}^{*\prime}$ is obtained similarly to the above equation (2) from the following equation (3):

$$i^*_y = \text{conventional y-axis target current value} + i^{*\prime}_y \qquad (3)$$

As a result, it is possible to effectively suppress the rotary bending vibration that occurs in the motor M10 by setting a target value of the Y-axis current value so that it cancels the eccentricity caused in the radial direction due to the magnetic attractive force acting on the rotor inside the motor M10.

As described above, in the third embodiment, it is possible to effectively suppress the rotary bending vibration that occurs in the motor M10 by adding the current component that cancels the magnetic attractive force acting in the radial direction of the rotor 1 to the target current of the magnet bearing 42.

INDUSTRIAL APPLICABILITY

The present invention is related to a permanent magnet motor controller. Especially, it is applicable to the permanent magnet motor controller using the dq coordinate conversion generally used for the controller of the permanent magnet motor.

The invention claimed is:

1. A permanent magnet motor controller including a rotor rotational shaft rotatably supported by a bearing, the permanent magnet controller comprising:
a current detecting part configured to detect a phase current flowing through a permanent magnet motor;
a three-phase/dq coordinate converting part configured to convert the phase current detected by the current detecting part into a current value of an orthogonal coordinate system (hereinafter, referred to as "dq coordinate system") that rotates in synchronization with a rotation of a motor;
a dq target current setting part configured to set a target current value of the dq coordinate system based on a rotation speed of the motor;
a dq target voltage generating part configured to generate a target voltage value of the dq coordinate system based on the current value of the dq coordinate system converted by the three-phase/dq coordinate converting part and the target current value of the dq coordinate system set by the dq target current setting part;
a dq/three-phase coordinate converting part configured to convert the target voltage value of the dq coordinate system generated by the dq target voltage generating part into a three-phase target voltage value;
a power converting part configured to convert the three-phase target voltage value generated by the dq/three-phase coordinate converting part into a three-phase motor driving current;
a rotation angle detecting part configured to detect a rotation angle of the rotor; and
a table configured to define in advance a displacement in a radial direction of the rotor based on the rotation angle of the rotor rotational shaft,
wherein a cyclic displacement having an eccentric frequency is defined in the table, the eccentric frequency being determined by a pole number of the permanent magnet motor and a slot number of the permanent magnet motor, and
wherein the dq target current setting part is configured to estimate a displacement corresponding to a detected value of the rotation angle detecting part based on the table and add a current component which is obtained from the estimated displacement and cancels a magnetic attractive force to a d-axis target current value set in the dq target current setting part so as to reduce an eccentricity of the rotor rotational shaft, the magnetic attractive force acting in a radial direction of a rotor rotational shaft of the permanent magnet motor and having cyclic behavior every electric angle of the rotor.

2. The permanent magnet motor controller according to claim 1,
wherein the rotor is connected to a rotational shaft of an electric supercharger or a rotational shaft of a generator.

3. The permanent magnet motor controller according to claim 2,
wherein the rotor is rotatably supported by a sliding bearing.

4. A permanent magnet motor controller including a rotor rotational shaft rotatably supported by a bearing, the permanent magnet motor controller comprising:
a current detecting part configured to detect a phase current flowing through a first stator winding wound around a stator iron core of a permanent magnet motor;
a three-phase/dq coordinate converting part configured to convert the phase current detected by the current detecting part into a current value of an orthogonal coordinate system (hereinafter, referred to as "dq coordinate system") that rotates in synchronization with a rotation of a motor;
a dq target current setting part configured to set a target current value of the dq coordinate system based on a rotation speed of the motor;
a dq target voltage generating part configured to generate a target voltage value of the dq coordinate system based on the current value of the dq coordinate system converted by the three-phase/dq coordinate converting part and the target current value of the dq coordinate system set by the dq target current setting part;
a dq/three-phase coordinate converting part configured to convert the target voltage value of the dq coordinate system generated by the dq target voltage generating part into a three-phase target voltage value;

a power converting part configured to convert the three-phase target voltage value generated by the dq/three-phase coordinate converting part into a three-phase motor driving current;

a second stator winding wound around the stator iron core of the permanent magnet motor independently of the first stator winding;

a rotation angle detecting part configured to detect a rotation angle of the rotor; and a table configured to define in advance a displacement in a radial direction of the rotor based on the rotation angle of the rotor rotational shaft, wherein a cyclic displacement having an eccentric frequency is defined in the table, the eccentric frequency being determined by a pole number of the permanent magnet motor and a slot number of the permanent magnet motor, wherein the displacement of the radial direction of the rotor based on the rotation angle of the rotor rotational shaft is estimated based on the table, and wherein a current which is obtained from the estimated displacement and cancels a magnetic attractive force is applied to the second stator winding so as to reduce an eccentricity caused on the rotor rotational shaft, the magnetic attractive force acting in a radial direction of the rotor rotational shaft of the permanent magnet motor and having cyclic behavior every electric angle of the rotor.

5. The permanent magnet motor controller according to claim 4,
wherein the rotor is connected to a rotational shaft of an electric supercharger or a rotational shaft of a generator.

6. The permanent magnet motor controller according to claim 5,
wherein the rotor is rotatably supported by a sliding bearing.

7. A permanent magnet motor controller comprising:
a current detecting part configured to detect a current which flows through a magnet bearing rotatably supporting a rotor rotational shaft of a permanent magnet motor;
a displacement sensor configured to detect a displacement amount in a radial direction of the rotor rotational shaft;
a target current value setting part configured to set a target current value flowing through the magnet bearing based on a detected value of the displacement sensor;
a current control part configured to control the current flowing through the magnet bearing so that the current becomes the target current value;
a rotation angle detecting part configured to detect a rotation angle of the rotor; and
a table configured to define in advance a displacement in a radial direction of the rotor based on the rotation angle of the rotor rotational shaft,
wherein a cycle displacement having an eccentric frequency is defined in the table, the eccentric frequency being determined by a pole number of the permanent magnet motor and a slot number of the permanent magnet motor, and
wherein the target current setting part is configured to estimate a displacement corresponding to a detected value of the rotation angle detecting part based on the table and add a current component which is obtained from the estimated displacement and cancels a magnet attractive force to the target current value so as to reduce an eccentricity of the rotor rotational shaft, the magnet attractive force acting in a radial direction of the rotor rotational shaft of the permanent magnet motor and having cyclic behavior every electric angle of the rotor.

8. The permanent magnet motor controller according to claim 7,
wherein the rotor is connected to a rotational shaft of an electric supercharger or a rotational shaft of a generator.

* * * * *